United States Patent [19]

Davis et al.

[11] 4,420,942

[45] Dec. 20, 1983

[54] NITROGEN LIQUID TO GAS CONVERTER EMPLOYING WATER HEAT EXCHANGERS

[76] Inventors: Warren E. Davis, 304 Everette Dr., Houma, La. 70360; Donald W. Granger, Rte. #11, Box 832, Lake Charles, La. 70601

[21] Appl. No.: 399,013

[22] Filed: Jul. 16, 1982

[51] Int. Cl.³ .............................................. F17C 7/02
[52] U.S. Cl. .......................................... 62/53; 60/618; 60/648
[58] Field of Search ................ 62/52, 53; 60/618, 648

[56] References Cited

U.S. PATENT DOCUMENTS

| | | | |
|---|---|---|---|
| 3,229,472 | 1/1966 | Beers | 62/53 |
| 3,535,210 | 10/1970 | Linde et al. | 62/333 |
| 4,031,705 | 6/1977 | Berg | 60/615 |
| 4,197,712 | 4/1980 | Zwick et al. | 62/53 |
| 4,242,986 | 1/1981 | Bo | 62/52 |
| 4,290,271 | 9/1981 | Granger | 62/53 |

*Primary Examiner*—Ronald C. Capossela
*Attorney, Agent, or Firm*—Bode & Smith

[57] ABSTRACT

A flameless nitrogen liquid to gas converter for providing high pressure nitrogen gas to treat oil and gas wells. A diesel engine prime mover drives hydraulic pumps and motors to pressurize nitrogen and actuate a closed-loop water system and a series of heat exchangers. The closed-loop water system provides heat for converting the liquid nitrogen to gaseous nitrogen which is obtained from the engine jacket water, the engine exhaust and the hydraulic oil from the hydraulic pumps and motors. Additional heat can be obtained from the hydraulic oil system by increasing the hydraulic system pressure with an hydraulic pressure control valve. At least one of the hydraulic pumps and its driven hydraulic motor is in an hydraulic circuit which includes variable means for increasing the pressure in the hydraulic circuit, hydraulic oil-water heat exchanger and an hydraulic oil reservoir. Hydraulic fluid from the other pumps and motors is transmitted through the hydraulic oil-water heat exchanger. The system includes a closed-loop water heat exchange system having in series in the water flow line upstream to downstream the following components in the following order: engine water-water heat exchanger, hydraulic oil-water heat exchanger, engine exhaust-water heat exchanger, nitrogen-water heat exchanger, and a centrifugal water pump capable of 100 gallons per minute at 60 psi.

43 Claims, 6 Drawing Figures

NITROGEN LIQUID TO GAS CONVERTER EMPLOYING WATER HEAT EXCHANGERS

BACKGROUND OF THE INVENTION

It is known in the art to convert liquid nitrogen to gaseous nitrogen to treat and stimulate oil and gas wells. The converter must pump nitrogen to high pressures, such as 10,000 psi, and heat the liquid nitrogen to convert it to gas. However, the environment around oil and gas wells is frequently hazardous and, therefore, the use of open flames or high temperatures to convert the liquid to gas is dangerous.

U.S. Pat. Nos. 4,290,271, 4,197,712, 4,031,705 and 3,229,472 are directed to liquid to gas converters, the most notable being exemplified by U.S. Pat. No. 4,290,271 which is directed to a nitrogen liquid to gas converter which employs an air stream as the heat exchange medium, and U.S. Pat. No. 4,197,172 directed to vaporizing cryogenic fluids with engine heat where direct contact between the engine water line and the nitrogen line raises the potential problem of the engine water freezing. The invention presented herein represents an improvement over such patented inventions. The present invention is more efficient than a system employing an air stream and considerably lighter in weight and avoids the problem of engine water freeze-up which exists in the prior art.

The present invention is directed to a self-contained flameless nitrogen liquid to gas converter which pressurizes the nitrogen and converts it into a gaseous state for use in an oil and gas field environment. More particularly, the present invention is directed to a nitrogen liquid to gas converter employing a closed-loop water system providing for a use of waste heat rejected from engine and hydraulic systems to be used in vaporizing the liquid nitrogen.

SUMMARY OF THE INVENTION

The present invention is directed to a nitrogen liquid to gas converter having a liquid nitrogen inlet and a nitrogen pump actuated by an hydraulic motor for pressurizing the nitrogen. The pressurized liquid nitrogen is passed through a nitrogen-water heat exchanger which is connected to the nitrogen pump and a centrifugal pump passes water in a closed-loop system over the exchanger for adding heat to the nitrogen and converting the liquid to gaseous nitrogen. Hydraulic pumps actuate the motor and a diesel engine drives the hydraulic pumps. Heat for heating the water and thus the nitrogen in the nitrogen-water heat exchanger is obtained from an engine exhaust-water heat exchanger and an engine water-water heat exchanger positioned in the closed-loop water system upstream from the nitrogen heat exchanger. Further heat is obtained from an hydraulic oil-water heat exchanger which passes water over the hydraulic circuit of the pumps and motors and is positioned in the water upstream from the nitrogen-water heat exchanger. Additional heat is obtained from means for increasing the pressure in the hydraulic oil circuit which increases the heat of the hydraulic fluid for heating the water which in turn heats the nitrogen in the nitrogen-water heat exchanger.

It is an object of the present invention to provide a nitrogen liquid to gas converter employing water as the heat transfer medium.

It is an object of the present invention to provide a nitrogen liquid to gas converter employing water as the heat tranfer medium to provide greater efficiency than a system employing air as the heat transfer medium.

It is an object of the present invention to provide water in a closed-loop water system as the heat transfer medium to negate the risk of engine water freezing in an open-loop system.

An object of the present invention is to provide a means for increasing the heat of the hydraulic fluid which is a variable hydraulic pressure control valve which is preferably positioned downstream from a pump.

Still a further object of the present invention is the improvement of obtaining heat from hydraulic fluid in which at least one of the hydraulic pumps and its driven hydraulic motor is in an hydraulic circuit which includes an hydraulic oil-water heat exchanger and variable means for increasing pressure in the hydraulic circuit for increasing the heat of the hydraulic fluid for heating the water and thus heating the nitrogen. Preferably the hydraulic circuit includes an hydraulic oil reservoir downstream from the hydraulic oil-water heat exchanger. In addition, hydraulic fluid from other pumps and motors may be transmitted through the hydraulic oil-water heat exchanger.

Yet a still further object of the present invention is to provide that the heat exchanger equipment be positioned in series in the closed-loop water system from the usptream to the downstream in the following order: engine water—water heat exchanger, hydraulic oil-water heat exchanger, engine exhaust—water heat exchanger, nitrogen—water heat exchanger, and centrifugal water pump to provide for maximum efficiency. Further, it is specified that the water circuit for adding heat to liqid nitrogen is separate from the water circuit for engine cooling.

Other and further objects, features and advantages of the present invention will be apparent from the following description of a presently preferred embodiment of the invention given for the purpose of disclosure and taken in conjunction with the accompanying drawings.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
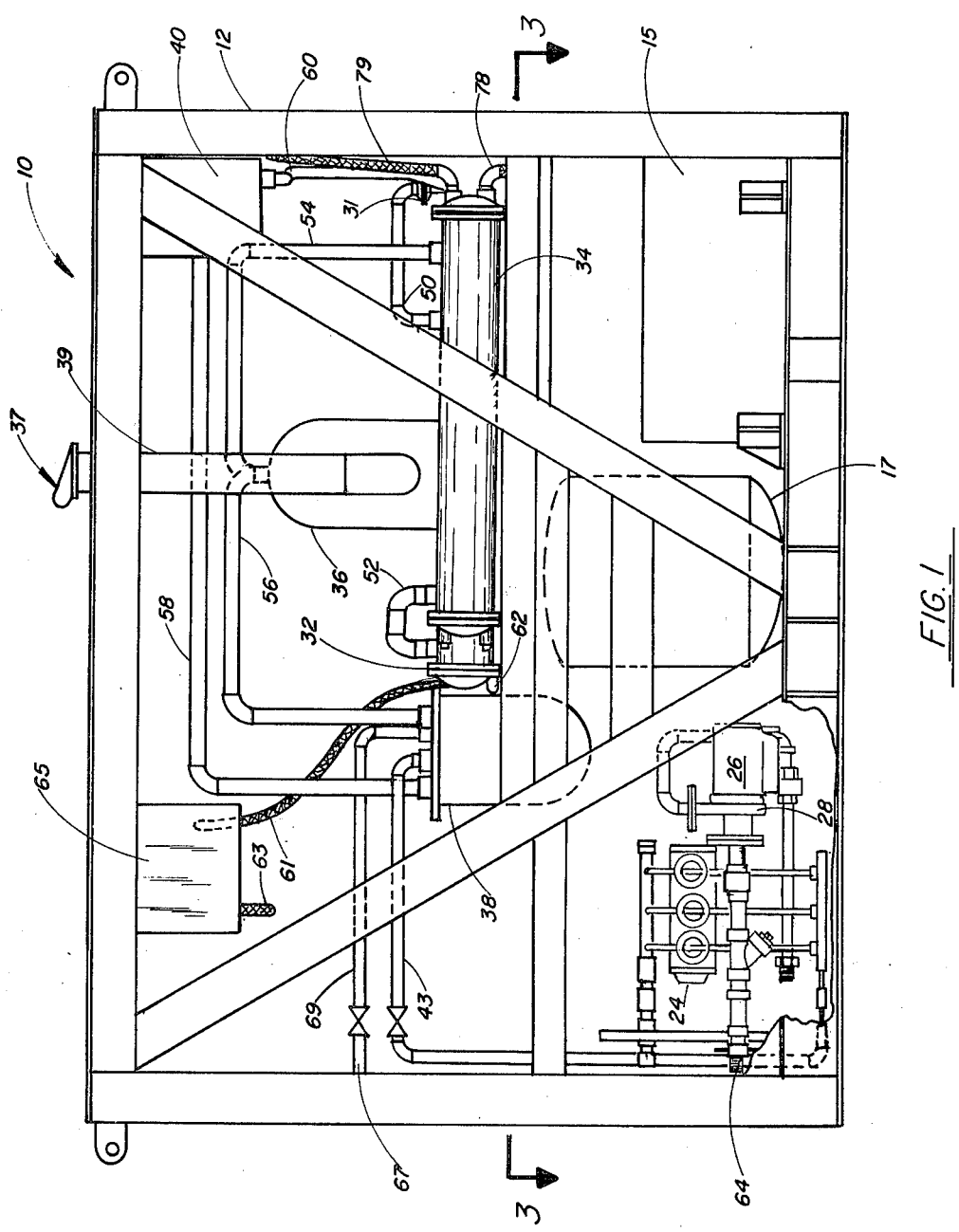
FIG. 1 is a front elevational view of the preferred embodiment of the apparatus of the present invention omitting certain flow lines for convenience.

Referring now to the drawings, particularly to FIGS. 1-4, the reference numeral 10 generally indicates the nitrogen liquid to gas converter which is mounted on a suitable self-contained support 12 whereby the converter may be suitably transported for treatment of various oil and/or gas wells both onshore and particularly offshore. A suitable prime mover 14 such as Detroit diesel engine model 6V92T and its accompanying fuel tank 15 are mounted on the support 12 for providing all the power necessary for converter 10. Air reservoir 17 is provided for starting engine 14 with air is approximately 120 psi. A plurality of hydraulic pumps 16, 18 are mechanically connected to and actuated by the engine 14 and in turn provide the motor force for driving various hydraulic motors for actuating one or more liquid nitrogen pumps and a centrifugal water pump. Pump 16 may be Model 24 sold by Sunstrand, pump 18 may be Model 26 sold by Sunstrand.

Figure 4:
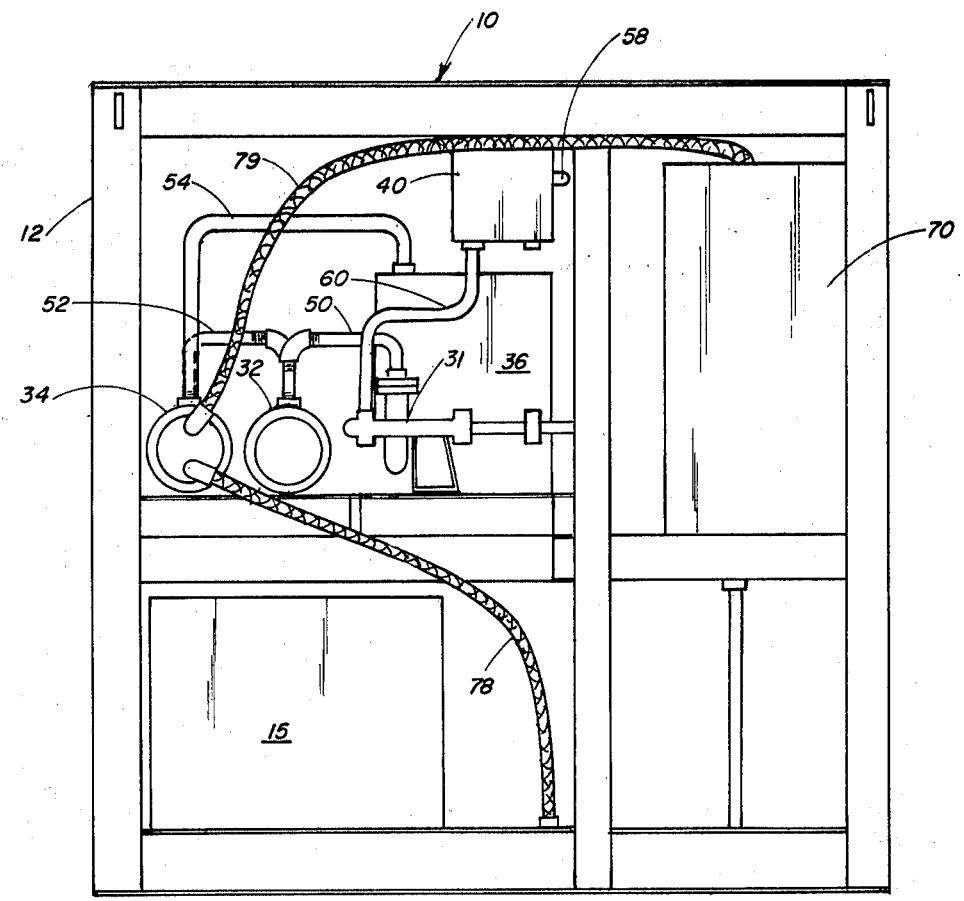
FIG. 4 is an end or side view of the apparatus of FIG. 1.
Figure 6:
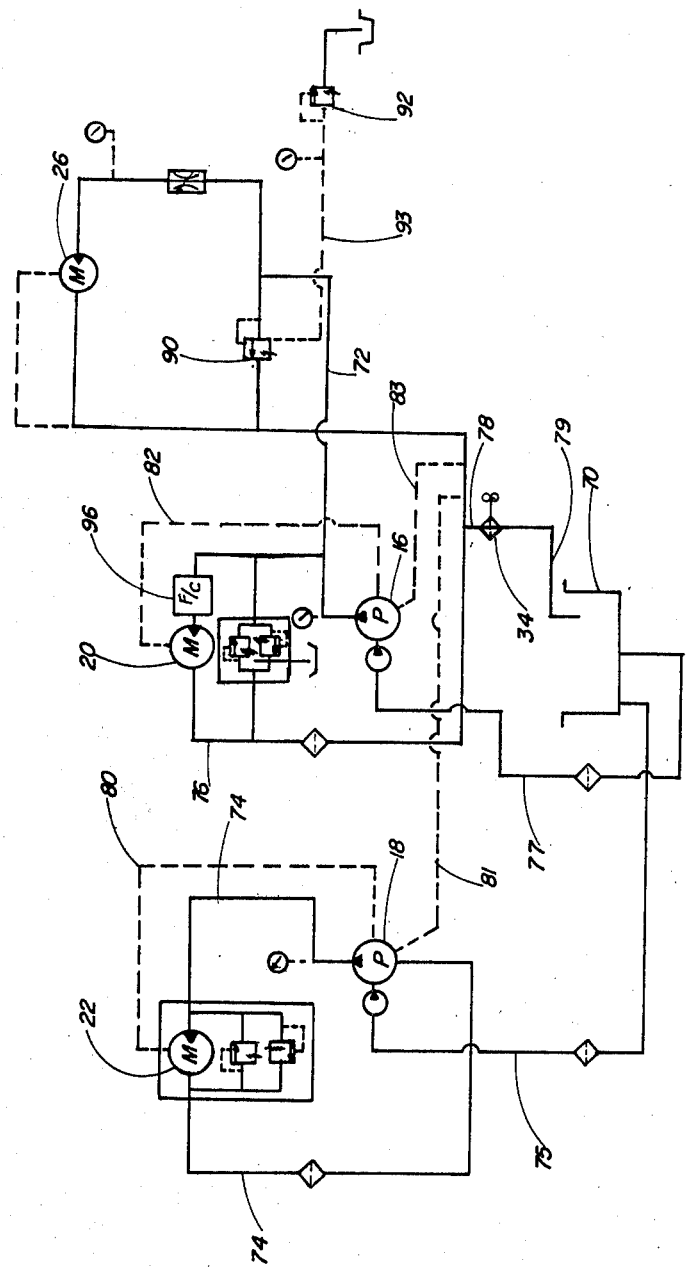
FIG. 6 is a hydraulic schematic of the apparatus of the preferred embodiment of the present invention.

Hydraulic pump 16 in turn drives a hydraulic motor 20 as seen in FIG. 6 such as Volvo, which in turns drives a water centrifugal water pump 31 as best seen in FIGS. 1 and 4, which pumps water through a nitrogen vaporizer or nitrogen-water heat exchanger 38 for adding heat to the liquid nitrogen for converting the liquid nitrogen to a gaseous state. Hydraulic pump 18 drives hydraulic motor 22 such as Model 27 manufactured by Sunstrand, which in turn drives a positive displacement cryogenic liquid nitrogen pump 24. The pump 16 also drives hydraulic motor 26 such as Model 15-3021 manufactured by Sunstrand which in turns drives a conventional centrifugal cryogenic liquid nitrogen booster pump 28.

Figure 2:
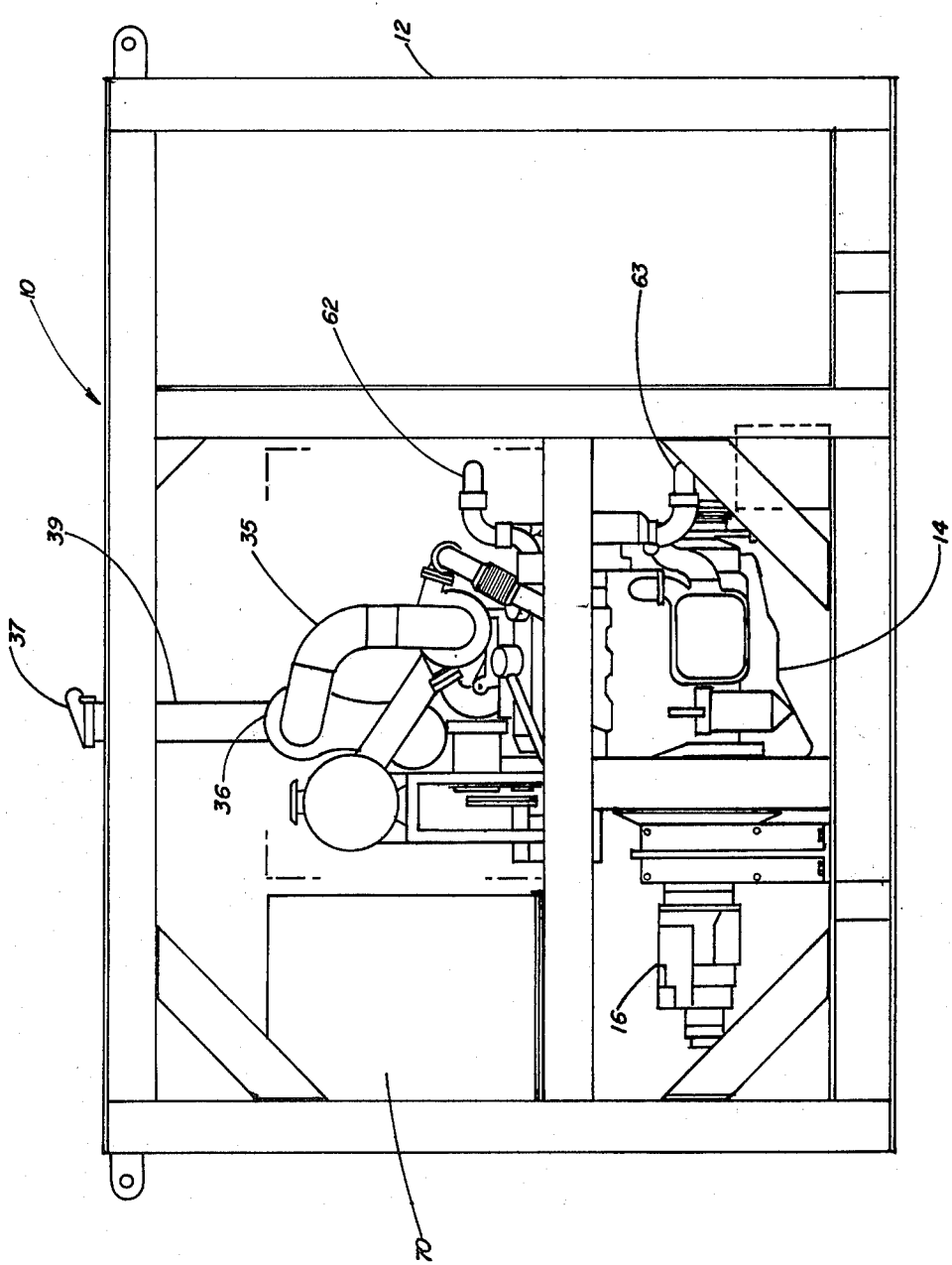
FIG. 2 is a rear elevational view of the apparatus of FIG. 1.

Referring now to FIGS. 1 through 5 an engine exhaust-water heat exchanger 36 is positioned in a closed-loop water system 30 upstream from the nitrogen heat exchanger 38 for heating the water in closed-loop system 30 for assisting in converting the liquid nitrogen to gaseous nitrogen. The engine exhaust line 35, as seen in FIG. 2, is covered with insullation (not shown) and provides engine exhaust in heat exchange relationship with engine exhaust-water heat exchanger 36. The cooled exhaust is then passed through exhaust stack 39 and vented to the atmosphere at weather cap 37. The engine exhaust-water heat exchanger 36 thus functions to utilize the waste heat from the exhaust of diesel engine 14 for heating the water in the closed-loop water system 30 and thus the nitrogen in converter 38, and additionally reduces the temperature of the exhaust to approximately 75° F. above ambient temperature for preventing the exposure of high temperature exhaust to the surrounding environment of an oil and/or gas well. In addition, an engine jacket water-water heat exchanger 32 is positioned in the closed-loop water system 30 upstream from the nitrogen heat exchanger 38 for providing additional heat for heating the water in closed-loop system 30 and thus converting the liquid nitrogen into gas. Engine water-water heat exchanger 32 is connected in heat exchange relation with engine 14's cooling water and receives the heated engine cooling water through engine water feed line 62 as seen in FIGS. 1 and 2. After heat exchange, cooled engine water is returned to the engine 14 through return line or engine suction line 63 via line 61 and surge tank 65.

Figure 5:
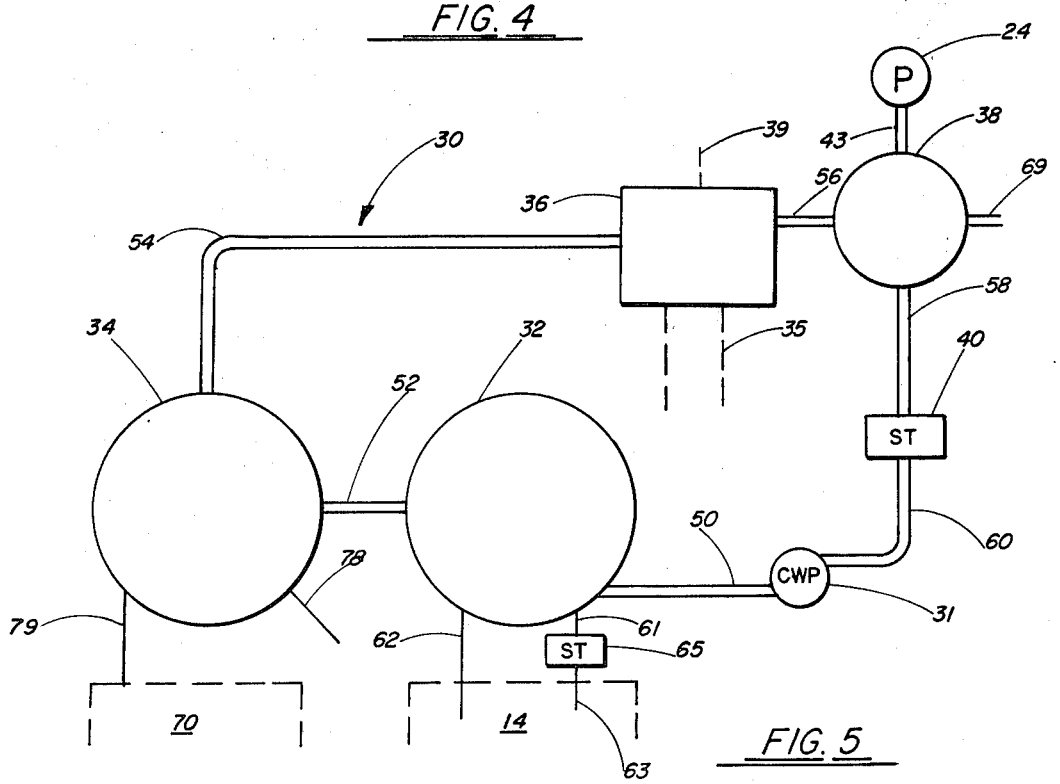
FIG. 5 is a schematic block diagram illustrating the closed-loop water system of the apparatus of the present invention.

In addition, as seen in FIGS. 1, 4 and 5, an hydraulic oil-water heat exchanger 34 is connected to various hydraulic pumps and motors, as will be more fully described herein, and is positioned in the closed-loop water system 30 upstream from the nitrogen-water heat exchanger or converter 38 for still providing additional heat of the hydraulic oil for heating the water in closed loop system 30 and thus the nitrogen in converter 38.

After water in closed-loop system 30 passes in heat exchange relation with nitrogen in converter 38 it is returned to surge tank 40 to be returned to centrifugal water pump 31 to repeat the loop (further described below). Furthermore, centrifugal water pump 31 and heat exchangers 32, 34, 36 are positioned in series in the closed-loop water system 30 from upstream to downstream in the following order: engine water-water heat exchanger 32, hydraulic oil-water heat exchanger 34, engine exhaust-water heat exchanger 36, whereby the incoming water stream is heated progressively to higher temperatures for greatest efficiency. However, it can be readily understood that engine water-water heat exchanger 32, hydraulic oil-water heat exchanger 34 and engine exhaust-water heat exchanger 36 are interchangeable in series in closed-loop water system 30 upstream of heat exchanger 38, although there will be some dimunition in efficiency as compared to the preferred order described hereinabove.

Referring now to FIGS. 1, 4 and 5 the circuit of closed-loop water system 30 can be best traced. Centrifugal water pump 31 passes water to engine water-water heat exchanger 32 via line 50, where the water in system 30 is heated by heat exchange relation with engine water in engine water line 62. After gaining heat in exchanger 32, the water in system 30 passes to hydraulic oil-water heat exchanger 34 via line 52, where the water in system 30 gains additional heat from heat exchange relation with oil in the hydraulic system via line 78. After gaining this additional heat in exchanger 34, the water in system 30 passes to engine-exhaust water heat exhanger 36 via line 54, where the water in system 30 gains additional heat from heat exchanger relation with engine exhaust in exhaust line 35. With the heat gain from exchangers 32, 34, 36, water in system 30 passes to nitrogen converter 38 via line 56, where the liquid nitrogen, introduced into converter 38 via line 43, gains heat from the water in system 30 and changes state to a gaseous state before discharge from the converter at nitrogen outlet 67 via line 69. After losing this heat in exchanger 38, the cooled water in system 30 passes to surge tank 40 via line 58 where it is drawn from by pump 31 via line 60 to be provided to exchanger 32 via line 50 and so on as described above. Again, it can be readily understood that heat exchangers 32, 34 and 36 are interchangeable in series in closed-loop system 30 upstream of nitrogen heat exchanger 38, although there will be some dimunition in efficiency as compared to the preferred order described hereinabove.

Figure 3:
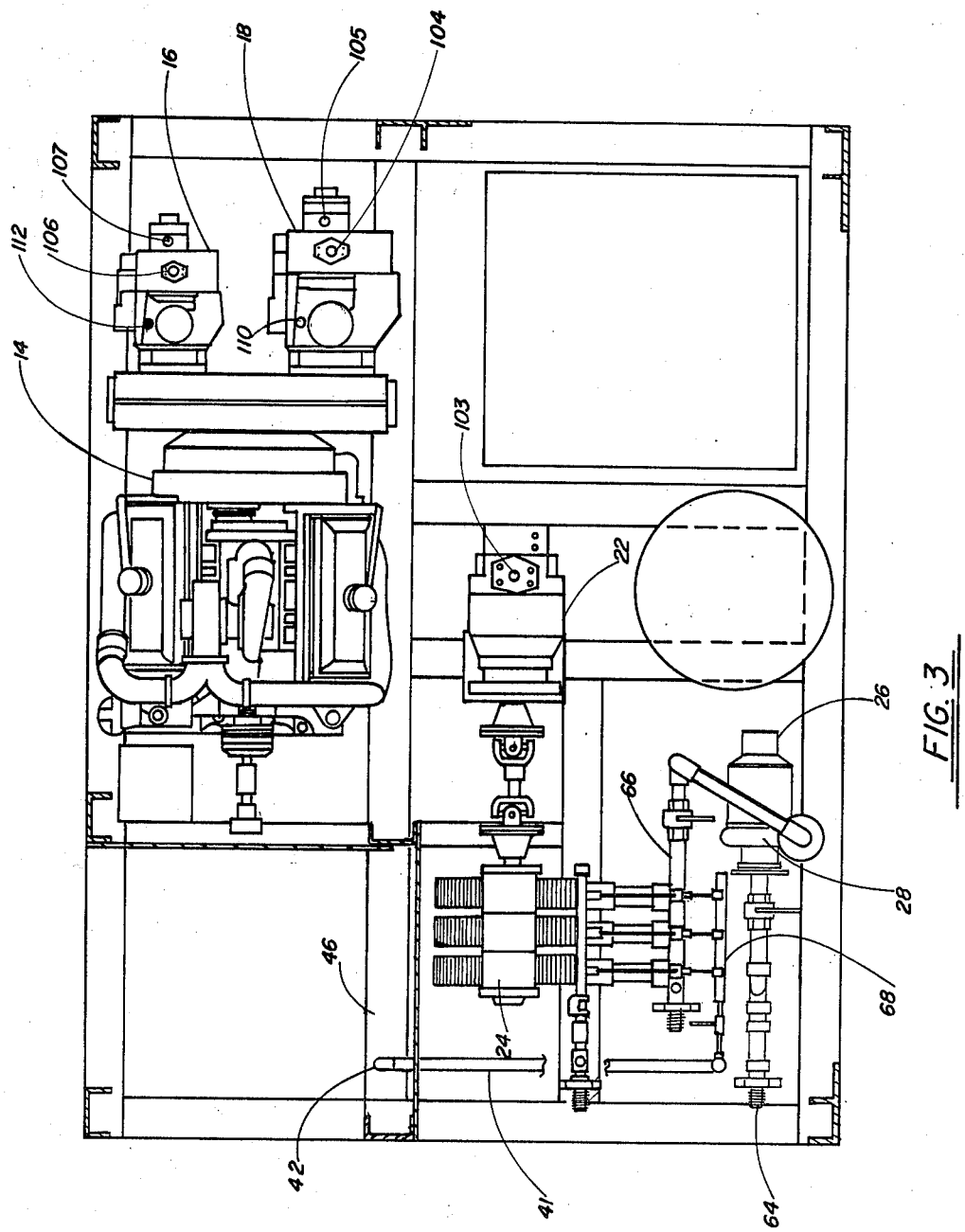
FIG. 3 is a cross-sectional view taken across line 3—3 of FIG. 1.

Referring now to FIG. 3, a liquid nitrogen inlet 64 is provided in communication with cryogenic liquid nitrogen centrifugal booster pump 28 whereby the liquid nitrogen is pressurized and passed to a supply header 66 for positive displacement cryogenic pump 24 wherein the liquid is further pressurized to critical high pressure and passed to a discharge header 68. Centrifugal booster pump 28 need not be employed if enough tank pressure is provided in the liquid nitrogen storage tank (not shown) in that centrifugal booster pump 28 is a booster pump which allows more time working with liquid nitrogen before the gas becomes saturated. From discharge header 68 the pressurized liquid nitrogen is passed through line 41 to supply manifold 42 in a control panel (not shown) in bulkhead 46 and on to the nitrogen-water water heat exchanger or converter 38 via supply line 43 wherein the nitrogen is converted to a gaseous state by the heat exchanged from flowing water in closed-loop system 30. From exchanger 38, the gaseous nitrogen is then discharged as required at nitrogen outlet 67 via discharge line 69.

Referring now to FIG. 6, a schematic of the hydraulic circuit is illustrated. A reservoir 70 of hydraulic fluid is provided for supplying and receiving hydraulic fluid from the circuits. One of the circuits, open-loop circuit 72, includes hydraulic pump 16 which supplies fluid to actuate hydraulic motor 26 which drives centrifugal cryogenic nitrogen booster pump 28. A second, closed-loop hydraulic circuit 74 includes hydraulic pump 18 which provides hydraulic fluid for actuating hydraulic motor 22 which drives positive displacement cryogenic nitrogen pump 24. Another open-loop hydraulic circuit 76 includes hydraulic pump 16 (both open-loop circuits 72 and 76 include the same pump 16) which provides fluid for actuating hydraulic motor 20 which drives centrifugal water pump 31.

It is desirable to obtain as much heat from converter 10 as possible for converting the liquid nitrogen to gas. In addition to obtaining heat from the exhaust and water from diesel engine 14, heat is exhausted from the hydraulic oil of the various hydraulic pumps and motors by virtue of hydraulic oil-water heat exchanger 34, thus the hydraulic fluid in circuit 72 flowing through pump 16 and motor 26 is transmitted by hydraulic line 78 to and then directly through hydraulic oil-water heat exchanger 34 prior to entering reservoir 70 via hydraulic line 79. On the other hand, circuit 74 may operate at higher pressures in a closed circuit between the pumps and motors. Make-up fluid for case drain is obtained through make-up line 75. The case drain for motor 22 is transmitted through line 80 and combined with the case drain for pump 18 in line 81 which is then transmitted to a manifold in frame 12 and then to line 78 for transmission to hydraulic oil-water heat exchanger 34. Similarly, the case drain in motor 20 is transmitted by lines 82 and combined with the case drain in pump 16 through a line 83 which is then transmitted to a manifold in frame 12 and then to line 78 for transmission to oil-water heat exchanger 34. In open-loop circuit 76 suction line 77 transmits hydraulic oil directly from reservoir 70.

Hydraulic pumps 16 and 18 are bidirectional and the suction and discharge lines can be reversed. However, in the preferred embodiment hydraulic pumps 16, 18 are single directional and as seen in FIG. 3, line 75, as make-up or suction line, will connect with hydraulic pump 18 at port 105 and line 74, as discharge to hydraulic motor 22, will connect with hydraulic pump 18 at port 104 and hydraulic motor 22 at port 103. Similarly, make-up or suction line 77 is connected to hydraulic pump 16 at port 107 and line 76, as discharge to hydraulic motor 20, will connect to hydraulic pump 16 at port 106 and hydraulic motor 20 (not shown) at its port. The case drain in hydraulic motor 20 is transmitted by line 82, which is connected to hydraulic pump 16 at port 112, and combined with the case drain of pump 16 as described above. Similarly, the case drain in motor 22 is transmitted by line 80, which is connected to hydraulic pump 18 at port 110, and combined with the case drain of pump 18 as described above. The case drain port of motor 22 and the motor 20 itself are not shown in FIG. 3.

In addition, the present invention includes means for obtaining increased heat from hydraulic fluid for heating the water in closed-loop system 30 and thus the nitrogen in nitrogen water heat exchanger 38. Preferably means are provided, connected in at least one of the hydraulic circuits, for increasing the pressure in the hydraulic circuit thereby increasing the heat of the hydraulic fluid which is transmitted to the hydraulic oil-water heat exchanger 34 for heating the water in closed-loop system 30 and thus the nitrogen at converter 38. Returning now to FIG. 6 and referring to open-loop circuit 72, a variable means for increasing the pressure in the hydraulic circuit such as a relief valve 90, such as Model P8819-06 from Rivett Company, is provided which can provide a variable restriction in the circuit 72 causing pump 16 to work at greater pressures and thereby create extra heat in the hydraulic fluid if the pressure is increased sufficiently by valve 90. Valve 90 is controlled through control line 93 by manually actuated pressure control valve 92. Therefore, by merely adjusting the pressure control valve 92, valve 90 is controlled so that additional heat may be supplied for heating the water in system 30 and thus the nitrogen at converter 38 without providing any dangerous spark igniting means in the hazardous environment surrounding the oil or gas well.

In open-loop circuit 76 upstream of motor 20 is placed manually actuated control valve 96 which controls the pressure and speed of motor 20 to protect centrifugal water pump 31.

The present invention provides a liquid to gas nitrogen converter which is self-contained, has a single prime mover and, by employing a closed-loop water heat exchange system, utilizes waste heat of the diesel engine including both its cooling water and exhaust, and further utilizes heat from the hydraulic oil system of the various pumps and motors and is able to create additional heat from the hydraulic circuits for converting the liquid to gas, all without danger to the hazardous surroundings of an oil and gas well.

The present invention, therefore, is well adapted to carry out the objects and attain the ends and advantages mentioned as well as others inherent therein. While the presently preferred embodiment of the invention is given for the purpose of disclosure, numerous changes in the details of construction and arrangement of parts may be made which readily suggest themselves to those skilled in the art which are encompassed within the spirit of the invention and scope of the appended claims.

What is claimed as invention is:

1. An apparatus for converting liquid nitrogen to gaseous nitrogen comprising:
   a. a source of liquid nitrogen;
   b. at least one liquid nitrogen inlet;
   c. means for pumping said liquid nitrogen connected to said inlet;
   d. engine means for driving said pumping means having engine fluid flow therethrough;
   e. first heat exchanger having first fluid flow therethrough and connected to said means for pumping liquid nitrogen wherein heat is provided from said first fluid to said liquid nitrogen thereby converting said liquid nitrogen to gaseous nitrogen;
   f. means for conducting said first fluid through said first heat exchanger; and
   g. second heat exchanger having said first fluid flow therethrough and providing engine fluid from said engine means in heat exchange relation with said first fluid.

2. The apparatus of claim 1 wherein said first fluid is provided in a closed-loop system.

3. The apparatus of claim 2 wherein said first fluid is preferably substantially water.

4. The apparatus of claim 1 further comprising at least one additional heat exchanger having said first fluid flow therethrough and providing heat to said first fluid.

5. The apparatus of claim 4 wherein said additional heat exchanger provides exhaust from said engine means in heat exchange relation with said first fluid.

6. An apparatus for converting liquid nitrogen to gaseous nitrogen comprising:
   a. a source of liquid nitrogen;
   b. at least one liquid nitrogen inlet;
   c. means for pumping said liquid nitrogen actuated by hydraulic means and connected to said inlet;
   d. engine means for driving said pumping means and said hydraulic means having engine fluid flow therethrough;
   e. first heat exchanger having first fluid flow therethrough and connected to said means for pumping liquid nitrogen wherein heat is provided from said first fluid to said liquid nitrogen thereby converting liquid nitrogen to gaseous nitrogen.
   f. means for conducting said first fluid through said first heat exchanger actuated by hydraulic means;
   g. second heat exchanger having said first fluid therethrough and providing engine fluid from said engine means in heat exchange relation with said first fluid; and
   h. a third heat exchanger having said first fluid flow therethrough and providing hydraulic fluid from said hydraulic means in heat exchange relation with said first fluid.

7. The apparatus of claim 6 wherein said first fluid is provided in a closed-loop system.

8. The apparatus of claim 7 wherein said first fluid is preferably substantially water.

9. The apparatus of claim 6 wherein said means for pumping liquid nitrogen is actuated by a first hydraulic motor.

10. The apparatus of claim 9 wherein said means for conducting said first fluid through said first heat exchanger is actuated by a second hydraulic motor.

11. The apparatus of claim 10 further comprising means for actuating said first and second motors.

12. The apparatus of claim 11 wherein said engine means drives said means for actuating said first and second motors.

13. The apparatus of claim 11 wherein said third heat exchanger provides hydraulic fluid from said actuating means and motors in heat exchange relation with said first fluid.

14. The apparatus of claim 6 further comprising at least one additional heat exchanger having said first fluid flow therethrough and providing heat to said first fluid.

15. The apparatus of claim 14 wherein said additional heat exchanger provides exhaust from said engine means in heat exchange relation with said first fluid.

16. The apparatus of claim 6 wherein said hydraulic means are hydraulic motors.

17. An apparatus for converting liquid nitrogen to gaseous nitrogen comprising:
   a. source of liquid nitrogen;
   b. at least one liquid nitrogn inlet;
   c. means for pumping liquid nitrogen actuated by a first hydraulic motor and connected to said inlet;
   d. first heat exchanger having fluid flow therethrough and connected to said means for pumping liquid nitrogen wherein heat is provided from said fluid to said liquid nitrogen thereby converting said liquid nitrogen to gaseous nitrogen;
   e. means for conducting said fluid through said first heat exchanger actuated by a second hydraulic motor;
   f. hydraulic means for actuating said first and second motors;
   g. engine means for driving said hydraulic means for actuating said motors;
   h. second heat exchanger having said fluid flow therethrough and providing engine fluid from said engine in heat exchange relation with said fluid;
   i. third heat exchanger having said fluid flow therethrough and connected to said hydraulic means for actuating said motors and said first and second hydraulic motors for providing hydraulic fluid from said actuating means and motors in heat exchange relation with said fluid; and
   j. fourth heat exchanger having said fluid flow therethrough and providing exhaust from said engine in heat exchange relation with said fluid.

18. The apparatus of claim 19 wherein said fluid is provided in a closed-loop system.

19. The apparatus of claim 18 wherein said fluid is preferably water.

20. The apparatus of claim 18 wherein said means for passing fluid through said first heat exchanger is a centrifugal pump.

21. The apparatus of claim 18 wherein said second, third and fourth heat exchangers are provided upstream from said first heat exchanger in said fluid system.

22. The apparatus of claim 18 further comprising means connected to said means for actuating said motors for increasing the heat of said hydraulic fluid for heating said fluid passing through said first heat exchanger.

23. The apparatus of claim 22 wherein the means for increasing the heat of said hydraulic fluid is a hydraulic pressure control valve.

24. The apparatus of claim 23 wherein said control valve is positioned downstream in said hydraulic system from said means for actuating said motors.

25. The apparatus of claim 18 wherein said first, second, third and fourth heat exchangers and said means for conducting fluid through said heat exchangers are alligned in series in said closed-loop fluid system.

26. The apparatus of claim 25 wherein said centrifugal pump and said heat exchangers are positioned in series in said closed-loop fluid system from upstream to downstream in the following order:
   a. said engine fluid-fluid heat exchanger,
   b. said hydraulic fluid-fluid heat exchanger,
   c. said engine exhaust-fluid heat exchanger,
   d. said nitrogen-fluid heat exchanger, and
   e. said centrifugal pump.

27. An apparatus for converting liquid nitrogen to gaseous nitrogen comprising:
   a. a source of liquid nitrogen;
   b. at least one liquid nitrogen inlet;
   c. pump actuated by a first hydraulic motor and connected to said inlet for pumping liquid nitrogen;
   d. nitrogen-fluid heat exchanger having fluid flow therethrough connected to the nitrogen pump for adding heat to said nitrogen and converting said liquid nitrogen to gaseous nitrogen;
   e. centrifugal pump for conducting said fluid in a closed-loop fluid system through said nitrogen-fluid heat exchanger and actuated by a second hydraulic motor;
f. hydraulic pump means for actuating said first and second motors;
g. engine means for driving said hydraulic pump means and having an engine fluid system;
h. engine fluid-fluid heat exchanger provided in said fluid system upstream from said nitrogen-fluid heat exchanger for heating said fluid, said engine fluid being in a stream separated from said closed-looped fluid system;
i. hydraulic fluid-fluid heat exchanger connected to said hydraulic pump means and said first and second hydraulic motors and provided in said fluid system upstream from the nitrogen-fluid heat exchanger for heating said fluid; and
j. engine exhaust-fluid heat exchanger provided in said fluid system upstream from said nitrogen-fluid heat exchanger for heating said fluid.

28. The apparatus in claim 27 wherein said fluid in said closed-loop system is preferably water.

29. The apparatus of claim 27 further comprising means connected to said pump means for increasing the heat of said hydraulic fluid for heating said fluid in said closed-loop system.

30. The apparatus of claim 29 wherein said means for increasing the heat of said hydraulic fluid is a hydraulic pressure control valve.

31. The apparatus of claim 30 wherein said control valve is provided downstream from said pump means.

32. The apparatus of claim 31 wherein said engine fluid-fluid heat exchanger, said hydraulic fluid-fluid heat exchanger, said engine exhaust-fluid heat exchanger, said nitrogen-fluid heat exchanger and said centrifugal pump are alligned in series in said closed-loop fluid system.

33. The apparatus of claim 32 wherein said centrifugal pump and heat exchangers are positioned in series in said closed-loop fluid system from upstream to downstream in the following order:
   a. engine fluid-fluid heat exchanger,
   b. hydraulic fluid-fluid heat exchanger,
   c. engine exhaust-fluid heat exchanger,
   d. nitrogen-fluid heat exchanger, and
   e. centrifugal pump.

34. An apparatus for converting liquid nitrogen to gaseous nitrogen comprising:
   a. engine means in which the heat rejection of the engine fluid and engine exhaust are utilized to convert liquid nitrogen to the gaseous state;
   b. a plurality of hydraulic pumps driven by said engine means, each of said pumps separately driving at least one hydraulic motor, one of said motors driving a nitrogen pump and the other of said motors driving a centrifugal pump for conducting a second fluid through a nitrogen-fluid heat exchanger;
   c. at least one of said hydraulic pumps and driven hydraulic motors being in a hydraulic circuit which includes hydraulic fluid-second fluid heat exchanger and variable means for increasing pressure in said hydraulic circuit for increasing the heat of the hydraulic fluid for heating said second fluid.

35. The apparatus of claim 34 wherein said variable means for increasing pressure in said hydraulic circuit includes an hydraulic flow control valve.

36. The apparatus of claim 35 wherein said control valve is positioned downstream in said hydraulic circuit from said pump.

37. The apparatus of claim 36 wherein said hydraulic circuit includes a hydraulic fluid reservoir downstream of said hydraulic fluid-second fluid heat exchanger.

38. The apparatus of claim 36 wherein hydraulic fluid from said other pumps and motors is transmitted through said hydraulic fluid-second fluid heat exchanger.

39. The apparatus of claim 38 wherein said second fluid is provided in a closed-loop system.

40. The apparatus of claim 39 wherein said second fluid is preferably water.

41. An apparatus for converting a liquid to a gas comprising:
   a. a source of liquid;
   b. at least one liquid inlet;
   c. means for pumping said liquid connected to said inlet;
   d. engine means for driving said pumping means having engine fluid flow therethrough;
   e. first heat exchanger having second fluid flow therethrough and connected to said means for pumping said liquid to be converted wherein heat is provided from said second fluid to said liquid thereby converting said liquid from a liquid to a gaseous state;
   f. means for conducting said second fluid through said first heat exchanger; and
   g. second heat exchanger having said second fluid flow therethrough and providing engine fluid from said engine means in heat exchange relation with said second fluid.

42. The apparatus of claim 42 wherein said liquid being converted to a gaseous state is a cryogenic fluid.

43. The apparatus of claim 42 wherein said second fluid is provided in a closed-loop system.

* * * * *

UNITED STATES PATENT AND TRADEMARK OFFICE
CERTIFICATE OF CORRECTION

PATENT NO. : 4,420,942
DATED : December 20, 1983
INVENTOR(S) : Warren E. Davis and Donald W. Granger It is certified that error appears in the above-identified patent and that said Letters Patent are hereby corrected as shown below:

Claim 18: "19" should read --17--.

Claim 42: "42" should read --41--.

Claim 43: "42" should read --41--.

Signed and Sealed this

Twenty-fourth Day of April 1984

[SEAL]

Attest:

GERALD J. MOSSINGHOFF

*Attesting Officer* — *Commissioner of Patents and Trademarks*